United States Patent [19]

Taniguchi

[11] Patent Number: 5,764,344
[45] Date of Patent: Jun. 9, 1998

[54] OBSERVING APPARATUS

[75] Inventor: Akira Taniguchi, Yokohama, Japan

[73] Assignee: Nikon Corporation, Tokyo, Japan

[21] Appl. No.: 633,947

[22] Filed: Apr. 17, 1996

[30] Foreign Application Priority Data

Aug. 22, 1995 [JP] Japan .................................. 7-213567

[51] Int. Cl.⁶ .................................................. G01C 3/06
[52] U.S. Cl. .................................................. 356/3.16
[58] Field of Search ................................ 356/3.13, 3.14, 356/3.15, 3.16, 8; 364/167.01, 474.36; 33/1 CC, 1 DD

[56] References Cited

U.S. PATENT DOCUMENTS

| 4,622,458 | 11/1986 | Boeck et al. | 356/3.16 |
| 5,008,543 | 4/1991 | Bertrand et al. | 356/3.16 |
| 5,026,153 | 6/1991 | Suzuki et al. | 356/3.16 |

FOREIGN PATENT DOCUMENTS

| 2-232513 | 9/1990 | Japan | 356/3.16 |

*Primary Examiner*—Ronald L. Biegel

[57] ABSTRACT

An observing apparatus by which a plurality of observers are able to easily find out the same target object includes first and second telescopes. The first telescope has an arithmetic control unit for generating positional data for indicating a position of the first telescope with respect to the observation target object when the observation target object is observed through the first telescope and a transmitter for transmitting the generated positional data to the second telescope. The second telescope has a receiver for receiving the positional data transmitted by the first telescope and a direction indicator for indicating an observation direction of the second telescope in which the observation target object should be observed through the second telescope on the basis of the positional data received by the receiver.

11 Claims, 4 Drawing Sheets

OBSERVING APPARATUS

BACKGROUND OF THE INVENTION

1. Field of the Invention

The present invention relates to an observing apparatus constructed of a plurality of telescopes.

2. Related Background Art

A telescope has hitherto been known as a typical optical apparatus but is classified into a variety of types such as a binocular, a monocular, etc.. The telescope is constructed by normally incorporating optical elements such as an object lens and an eyepiece.

An application of the telescope is diversified, and there is often seen in a resort or the like such a scene that each individual holds the telescope and observes through it.

Further, recently there has been a popular practice of watching birds, wherein a plurality of persons enjoy their leisure time by searching for a desired wild bird and observing its habits and behaviors.

In the prior art telescope, however, if the plurality of persons make observation (in the case of, e.g., bird watching), and when a certain observer finds the desired wild bird, the observer has no alternative but to inform other observers of a location of the wild bird through voices or hand motions in order to have them observing that wild bird. Further, if it is difficult to directly indicate the location of the wild bird, there is required such an action that the first finder has other observes detecting another target object (e.g., a tree with that wild bird) for the time being and makes them gradually closing on the location of the target wild bird. Also, all the commotion on the ground can scare away the target bird. As a matter of course, those laborious operations are not necessarily confined to the bird watching.

SUMMARY OF THE INVENTION

It is a primary object of the present invention to provide an observing apparatus by which a plurality of observers are capable of easily finding the same target object.

To accomplish the above object, according to a first aspect of the present invention, an observing apparatus system comprises a first optical apparatus and a second optical apparatus. The first optical apparatus comprises a positional data generating device for generating positional data for indicating a position of the first optical apparatus with respect to an observation target object when the observation target object is observed through the first optical apparatus and a transmitting device for transmitting the positional data to the second optical apparatus. The second optical apparatus comprises a receiving device for receiving the positional data transmitted by the first optical apparatus, an observation direction calculating device for calculating an observation direction of the second optical apparatus, in which the observation target object should be observed through the second optical apparatus on the basis of the positional data received by the receiving device and an output device for outputting data corresponding to the observation direction of the second optical apparatus that has been calculated by the observation direction calculating device.

To accomplish the above object, according to a second aspect of the present invention, the position of the observation target object in terms of the positional data in the first aspect is a position on coordinates for setting a relative position between the first optical apparatus and the second optical apparatus.

To accomplish the above object, according to a third aspect of the present invention, the first optical apparatus in the first or second aspect further comprises a distance measuring device for measuring a distance between the observation target object and the first optical apparatus and a direction measuring device for measuring a direction of the observation target object with the first optical apparatus serving as an origin. The position data generating device generates the positional data on the basis of a result of distance measurement by the distance measuring device and a result of the measurement by the direction measuring device.

To accomplish the above object, according to a fourth aspect of the present invention, the observation direction calculating device in the first, second or third aspect calculates at least one of horizontal and perpendicular directions of the second optical apparatus.

To accomplish the above object, according to a fifth aspect of the present invention, the direction measuring device in the third or fourth aspect comprises at least one of a bearing detector for detecting a bearing based on magnetic north and an angle detector for detecting an angle-of-elevation with respect to a predetermined fiducial plane and a measuring device for performing a measurement by use of at least one of a result of the detection by the bearing detector and a result of the detection by said angle detector, which are made when observing the observation object through the first optical apparatus.

To accomplish the above object, according to a sixth aspect of the present invention, the output device in the first, second third, fourth or the fifth aspects has a display portion for displaying the data corresponding to the observation direction within a visual field of the second optical device.

According to the present invention, a positional data generating device generates positional data indicating a position of the first optical apparatus with respect to an observation target object when observed through the first optical apparatus. A transmitting device transmits the positional data to the second optical apparatus. A receiving device of the second optical apparatus receives the positional data. An observation direction calculating device calculates an observation direction of the second optical apparatus, in which the observation target object should be observed through the second optical apparatus. An output device outputs data corresponding to the observation direction of the second optical apparatus that has been calculated by the observation direction calculated by the observation direction calculating device.

Further, if the first optical apparatus further comprises the distance measuring device and the direction measuring device, the positional data generating device generates the positional data on the basis of a result of the distance measurement by the distance measuring device and a result of the measurement by the direction measuring device.

The above observation direction calculating means calculates at least one of the horizontal and perpendicular directions of, e.g., the second optical apparatus.

If the above direction measuring device includes at least one of the bearing detector and the angle detector, the direction measuring device makes the measurement by use of at least one of a result of the detection by the bearing detector and a result of the detection by the angle detector, which are made when the observation target object is observed through the first optical apparatus.

Further, a display portion of the outputting device displays the data corresponding to the observation direction of the second optical apparatus within a visual field of the second optical apparatus.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

One embodiment of the present invention applied to a telescope will hereinafter be discussed with reference to the accompanying drawings.

Figure 1:
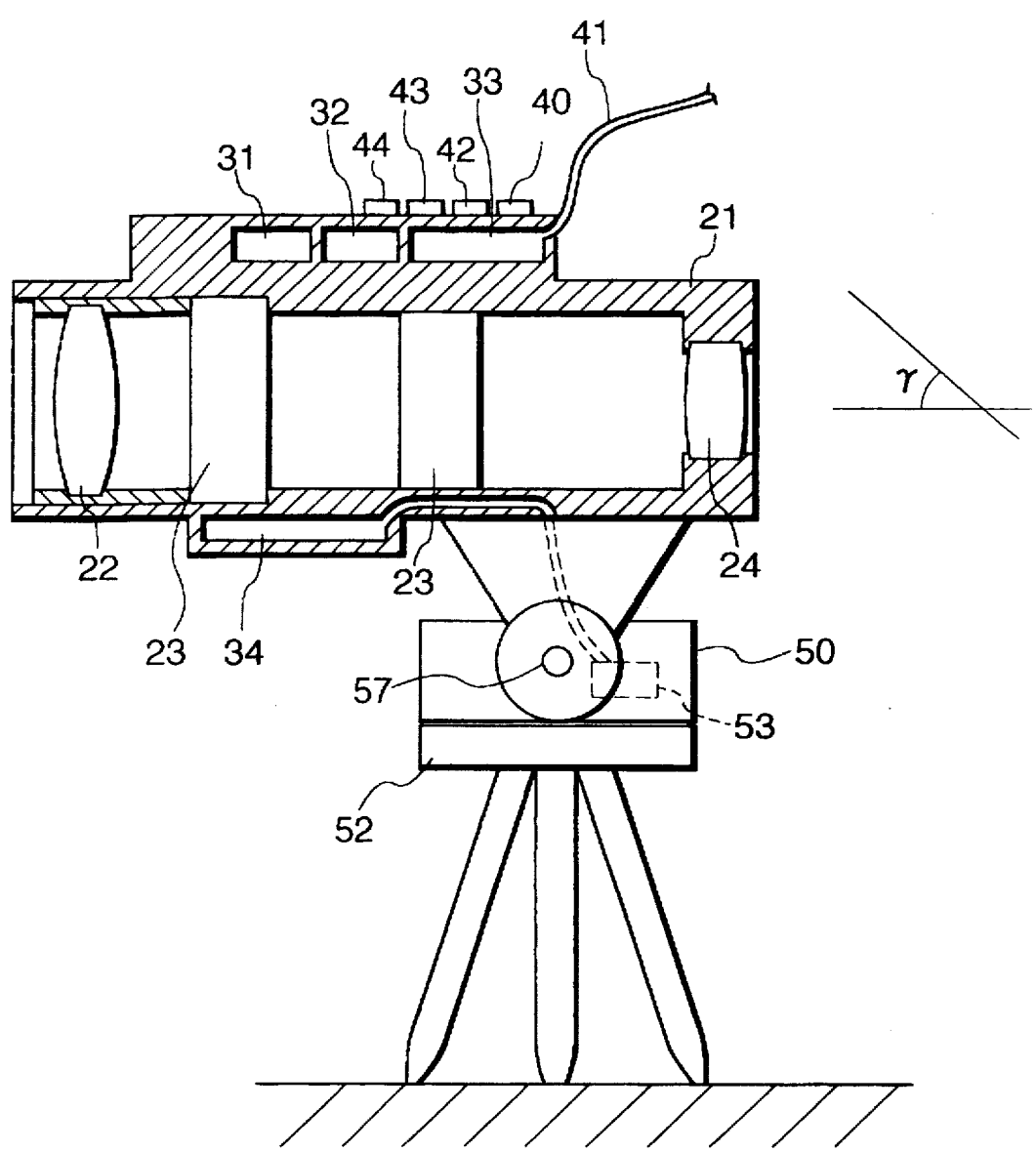
FIG. 1 is a view illustrating a construction of one embodiment of a telescope constituting an observing apparatus according to the present invention.

As illustrated in FIG. 1, the telescope in this embodiment comprises an objective lens 22, an eyepiece 24, a prism 23, a lens barrel 21 for holding these elements and a general mechanism for changing a distance between the objective lens 22 and the eyepiece 24 in accordance with a focusing operation (adjusting the focus) of an observer. Further, the lens barrel 21 incorporates a bearing sensor 31, a receiver 32, a transmitter 33 and an arithmetic control unit 34.

The arithmetic control unit 34 includes a CPU and a memory for storing programs executed by the CPU. An upper surface of the lens barrel 21 is provided with a transmission switch 40, a coordinate setting switch 42, a present position setting switch 43 and a detection switch 44. Those switches are not confined to configurations in this embodiment. For example, the arrangement may be such that there are prepared setting modes such as a transmission mode, a coordinate setting mode, a present position setting mode and a detection mode, and there are also provided two switches, i.e., a mode switch for switching those modes and a switch depressed in common to the respective modes. A transmission cable 41 is connected to the transmitter 33. The other end of the transmission cable 41 is connected to the receiver 32 of a telescope (having the same construction as that shown in FIG. 1) of the other party. Note that the system may be so constructed as to be capable of performing communications by radio transmission without using the transmission cable 41. The bearing sensor 31 is capable of calculating a bearing in which the telescope is directed. Further, a focusing quantity of the lens when performing the focusing operation can be also transmitted to the receiver 32 of the other party via the transmitter 33.

The lens barrel 21 is mounted to a rotary mount 50 through a rotary shaft 51. The rotary mount 50 is secured to a tripod 54 placed on the ground. A support base 52 supports the rotary mount 50 through a rotary shaft (unillustrated) perpendicular (orthogonal) to the rotary shaft 51. That is, the observer is able to horizontally rotating the rotary mount 50 while rotating the lens barrel 21 about the rotary shaft 51 in the perpendicular direction. The rotary mount 50 incorporates an angle detector 53 (e.g., a rotary encoder) for detecting an angle γ of the lens barrel 21 (more specifically the optical axis of the lens barrel 21) in the perpendicular direction with respect to the rotary mount 50. A result of this detection is transmitted to the arithmetic control unit 34.

Figure 2:
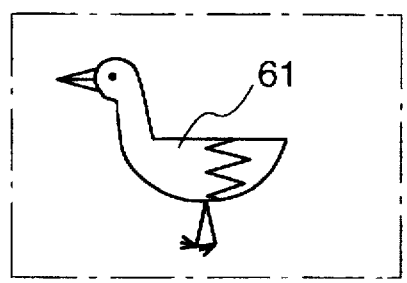
FIG. 2 is a view showing a configuration of a direction indicator of the telescope by way of one example.
Figure 2:
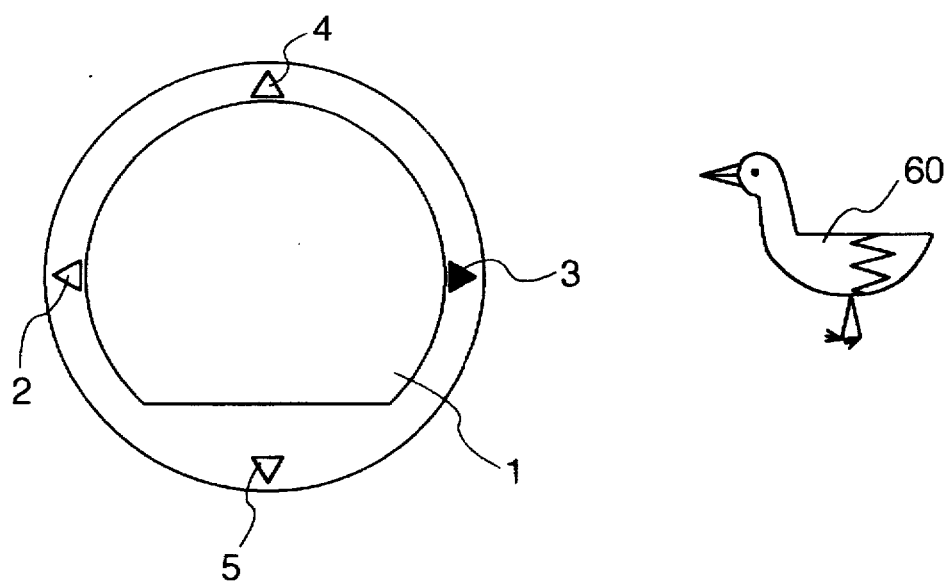

FIG. 2 illustrates how an object is viewed through the eyepiece 24 in the telescope. As illustrated in FIG. 2, direction indicators 2, 3, 4, 5 such as, e.g., LEDs are disposed in cross directions along the outer circumferential portion of a field area 1. Those direction indicators are turned ON/OFF under the control of the arithmetic control unit 34.

Next, the operation in this embodiment will be explained in combination with operating procedures of the telescope. Herein, two sets of telescopes shown in FIG. 1 are to be used. An observer A uses one (hereinafter called telescope A) of them, while the other one (hereinafter called telescope B) is used by an observer B. The telescopes A, B are connected via the transmission cable 41 in a communicable manner. Two sets of tripods 54 have the same length. Note that the two observers A, B be at the same level when making an observation for simplifying the explanation. Further, the explanation will be given, wherein the numerals indicating the constructive element of the telescope A are suffixed with a, while the numerals indicating the constructive elements are suffixed with b.

When using the telescopes, the initialization is at first required so that the individual telescopes mutually recognize relative positions in places where they are used.

Figure 3:
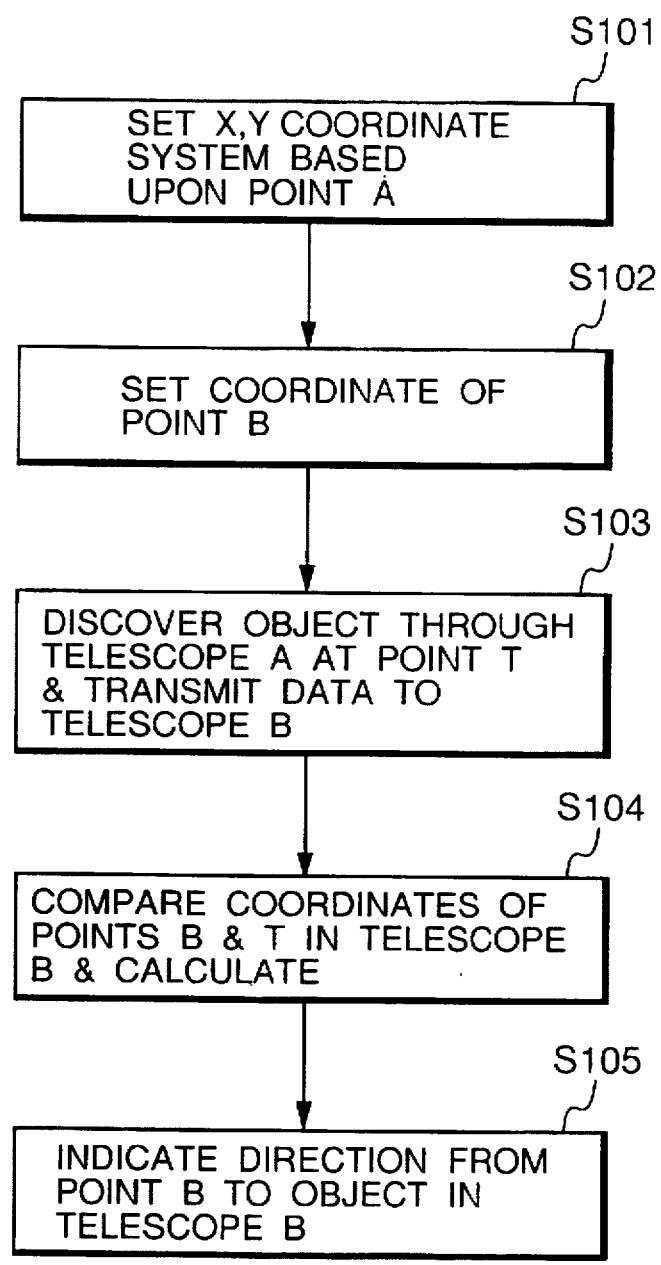
FIG. 3 is a flowchart showing processes of an arithmetic control unit of the telescope.

As illustrated in FIG. 3, in step S101, the observers A, B confirm the same target object S through their telescopes at the same given location (hereinafter referred to as a location A). The observer A depresses the coordinate setting switch 42a of the telescope A upon recognizing the target object S. Similarly, the observer B depresses the coordinate setting switch 42b of the telescope B on recognizing the target object S. The target object S is not particularly limited if recognizable by each observer. Herein, however, it is assumed that the target object be installed at the same sea level as the location A.

In the telescope A, the arithmetic control unit 34a detects that the coordinate setting switch 42a is depressed and measures a distance L from the location A to the target object S by use of a distance measuring device (unillustrated) built in the telescope A. This distance measuring device is the general one built in a camera, etc. and actualized by making use of a triangle measuring method and a phase difference detection method. The memory of the arithmetic control unit 34a is stored with a result of the measurement.

Further, the arithmetic control unit 34a detects a bearing of a direction (A–S direction) toward the target object S from the location A by using the bearing sensor 31a. The memory of the arithmetic control unit 34a is also stored with this bearing.

Figure 4:
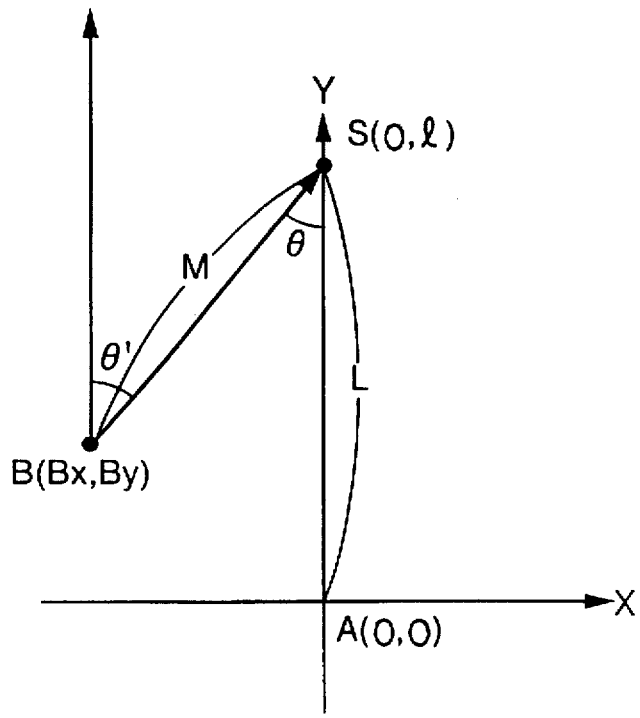
FIG. 4 is an explanatory graph showing coordinates in one embodiment of the telescope constituting the observing apparatus of the present invention.
Figure 5:
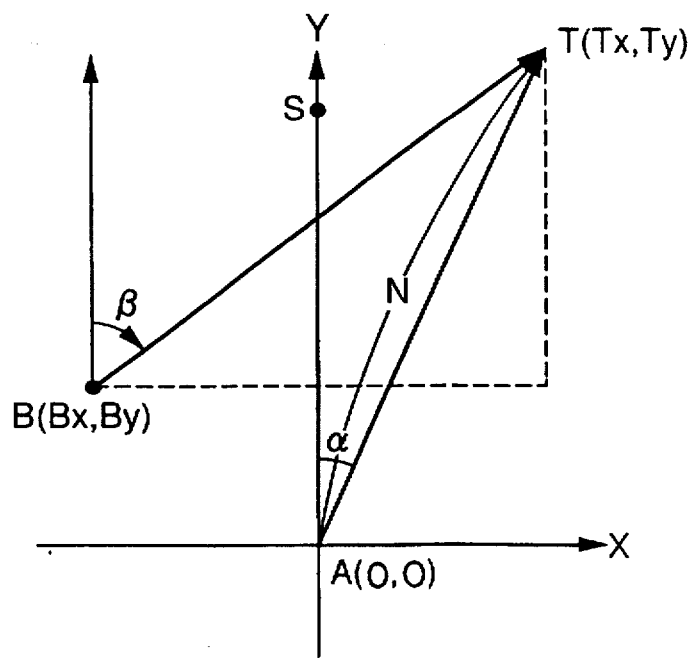
FIG. 5 is an explanatory graph showing the coordinates in one embodiment of the telescope constituting the observing apparatus of the present invention.

With the processes described above, in the arithmetic control unit 34a, there are set coordinate axes (specifically, the Y-axis coincident with the A–S direction and the X-axis orthogonal to the Y-axis and passing through the location A) as shown in FIGS. 4 and 5. Note that the coordinate of the target object S is expressed by S(O, l).

On the other hand, when the coordinate setting switch 42b of the telescope B is pushed down, the same processes are to be performed in the telescope B, and the coordinate axes as shown in FIGS. 4 and 5 are set in the arithmetic control unit 34b.

That is, the arithmetic control unit 34a and the arithmetic control unit 34b are hereafter to execute the processes based on the same coordinate axes.

Next, it is assumed that the observer B moves to a location B. At this time, the observer A remains as he or she is, i.e., positioned at an origin A(O, O). The sea level at the location B is the same as the location A, and the coordinate thereof is B(Bx, By).

At the location B, the observer B views through the telescope B and confirms the above target object S. Upon confirming the target object S, the observer B pushes down the present position setting switch 43b (S102). The arithmetic control unit 34b detects that the present position setting switch 43b is depressed and measures a distance M from the location B to the target object S by use of a distance measuring device (unillustrated) built in the telescope B. The memory of the arithmetic control unit 34b is stored with a result of the measurement.

Further, the arithmetic control unit 34b detects a bearing of a direction (B–S direction) toward the target object S from the location B by using the bearing sensor 31b. The memory of the arithmetic control unit 34b is also stored with this bearing.

Subsequently, the arithmetic control unit 34b compares the A–S direction with the B–S direction stored in the memory of its own and calculates an angle θ (=θ') made by them. Then, the arithmetic control unit 34b determines the coordinate of the B location as B(-Msinθ, L-Mcosθ) on the basis of the already-calculated distances L, M as well as on that angle θ. The initialization is finished here.

Next, the operations of the respective telescopes will be explained.

If the observer A finds out an observation target object T through the telescope A at the location A, the observer A depresses a detection switch 44a of the telescope A (S103). Note that the observation target object T be, it is assumed, situated at the same sea level as the sea level (=B-location sea level) at the location A and the coordinate thereof be T(Tx, Ty).

The arithmetic control unit 34a detects that the detection switch 44a is depressed and measures a distance N from the location A to the observation target object T and a direction (A–T direction) toward the observation target object T from the location A. The distance N and the A–T direction are detected by using the bearing sensor and the distance measuring device of the telescope A in the same manner as the above-mentioned.

Next, the arithmetic control unit 34a calculates an angle α made by the Y-axis and the A–T direction and determines T(Nsinα, Ncosα) by way of a coordinate of a location T on the basis of this angle α an the already-calculated distance N.

The arithmetic control unit 34a transmits the coordinate of this location T to the telescope B by use of the transmitter 33a. This transmission is started on pushing down the transmission switch 40a.

In the telescope B, the receiver 32b receives this coordinate of the location T. The arithmetic control unit 34b executes a calculation of the formula (1) based on the already-calculated coordinate (specifically, B(-Msinθ, L-Mcosθ) of the location B as well as on the T-location coordinate (specifically, T(Nsinα, Ncosα)) received by the receiver 32b (S104).

$$\tan\beta = \{(N\sin\alpha)-(-M\sin\theta)\}/\{(N\cos\alpha)-(L-M\cos\theta)\} \quad \text{(Formula 1)}$$

The angle β in the formula (1) is, as illustrated in FIG. 5, an angle made by the axis indicating the B–T direction and a passing-through-location-B imaginary axis parallel to the Y-axis and is, that is to say, a piece of data about the position of the observation target object T with the location B serving as a starting point.

The arithmetic control unit 34b controls direction indicators 2, 3, 4, 5 shown in FIG. 2 on the basis of this item of data (S105). More specifically, if the observation target object T is positioned in the right direction of the Figure with respect to a field area 1b of the telescope B (in the case of an observation target object 60 of FIG. 2), the direction indicator 3 is turned ON, whereas other direction indicators are turned OFF. Contrastingly when the observation target object T is positioned in the left direction in the Figure with respect to the field area 1b of the telescope B, the direction indicator 2 is turned ON, whereas other indicators are turned OFF.

The observer B is capable of visually recognizing the same observation target object T as that of the observation A by changing the direction of the telescope B in accordance with an indication of the above indicator.

Further, if the observer A moves from the location A, the present position setting switch 43a of the telescope A is depressed each time, and the present position may be detected each time.

Now, in the above discussion, there has been exemplified the case where the locations A, B have the same sea level, but it may happen that the locations A, B have some difference in altitude.

Then, in this embodiment, as illustrated in FIG. 1, the angle detector 53 of the rotary mount 50 detects an angle γ (angle-of-elevation γ) of the lens barrel 21 in the perpendicular direction with respect to the rotary mount 50. The arithmetic control unit of each of the telescopes A, B is so constructed as to be capable of measuring the angle-of-elevation γ of the telescope on the other party through the communication cable 41.

Then, for instance, when confirming the observation target object 61 as shown in FIG. 2 through the telescope A, the indicator 4 is turned ON in the telescope B. The observer B is able to find out the observation target object 61 by turning the telescope B upward, i.e., in the direction indicated by the indicator 4.

As discussed above, in accordance with this embodiment, the observer B becomes capable of simply and quickly finding the observation target object detected by the observer A. Concretely, the observers A, B are able to watch birds without communicating with each other.

Moreover, that will be applied to such a case that the observers A, B are positioned very far from each other, or there is an obstacle between the observers A and B enough to hinder their voices or hand motions from being conveyed.

Note that there are prepared the two telescopes used in this embodiment for simplifying the explanation but may be two or more telescopes. Further, this embodiment has taken the example wherein the telescope A transmits the data, and the telescope B receives the data. However, if the transmitter and the receiver are provided both in the telescope A and in the telescope B, the telescope B can transmit the data to the telescope A. Additionally, the present invention is applicable to a variety of optical apparatuses other than the telescopes.

As discussed above, according to the present invention, when the observation target object is detected by a certain optical apparatus, the data indicating the position of that observation target object can be outputted from another optical apparatus different therefrom, and, hence, the plurality of observers are able to simply find out the same observation target object.

It is apparent that, in this invention, a wide range of different working modes can be formed based on the invention without deviating from the spirit and scope of the invention. This invention is not restricted by its specific working modes except being limited by the appended claims.

What is claimed is:

1. An observing apparatus system comprising a first optical apparatus and a second optical apparatus, said first optical apparatus comprising:
- a positional data generating device to generate positional data about an observation target object observed through said first optical apparatus and about a relative position to said first optical apparatus; and
- a transmitting device to transmit the positional data to said second optical apparatus;

said second optical apparatus comprising:
- a receiving device to receive the positional data transmitted by said first optical apparatus;
- an observation direction determining device to determine an observation direction toward the observation target object from said second optical device; and
- an output device to output data about the observation direction determined by said observation direction determining device.

2. The observing apparatus system according to claim 1, wherein the relative position of the observation target object to said first optical device is set in a coordinate system determined based on a relative position between said first optical apparatus and said second optical apparatus.

3. The observing apparatus system according to claim 1, wherein said first optical apparatus further comprises:
- a distance measuring device to measure a distance between the observation target object and said first optical apparatus; and
- a direction measuring device to measure a direction toward the observation target object from said first optical apparatus, and
- wherein said position data generating device generates the positional data on the basis of a result of distance measurement by said distance measuring device and a result of the measurement by said direction measuring device.

4. The observing apparatus system according to claim 1, wherein the observation direction determined by said observation direction determining device contains at least one element of horizontal and perpendicular directions of said second optical apparatus.

5. The observing apparatus system according to claim 3, wherein said direction measuring device comprises:
- at least one of a bearing detector to detect a bearing based on magnetic north and an angle detector for detecting an angle-of-elevation with respect to a predetermined fiducial plane; and
- a measuring device to perform a measurement on the basis of at least one of a result of the detection by said bearing detector and a result of the detection by said angle detector, which are made when observing the observation object through said first optical apparatus.

6. The observing apparatus system according to claim 1, wherein said output device has a display portion to display the data about the observation direction within a visual field of said second optical apparatus.

7. The observing apparatus system according to claim 1, wherein in the coordinate system with the position of said first optical apparatus serving as an origin, let (-Msinθ, L-Mcosθ) be the coordinate of said second optical apparatus and (Nsinα, Ncosα) be the coordinate of the observation target object, and the following formula is established:

$$\tan\beta = \frac{(N\sin\alpha) - (-M\sin\theta)}{(N\cos\alpha) - (L - M\cos\theta)}$$

where
- L: the distance from said first optical device to a predetermined point of the coordinate system,
- M: the distance from said second optical apparatus to the predetermined point,
- N: the distance from said first optical apparatus to the observation target object,
- θ: the angle made by directions toward the said first and second optical apparatus from the predetermined point,
- α: the angle made by direction toward the predetermined point and the observation target object from said first optical apparatus, and
- β: the angle made by the direction toward the predetermined point from said first optical apparatus and a direction toward the observation target object from said second optical apparatus.

8. A second optical apparatus used together with a first optical apparatus constructed of a positional data generating device to generate positional data about a relative position between an observation target object observed through said first optical apparatus and said first optical apparatus and a transmitting device to transmit the positional data, said second optical apparatus comprising:
- a receiving device to receive the positional data transmitted by said first optical apparatus;
- an observation direction determining device to determine an observation direction toward the observation object from said second optical apparatus on the basis of the positional data received by said receiving device; and
- an output device to output data about the observation direction determined by said observation direction determining device.

9. A first optical apparatus comprising:
- a positional data generating device to generate positional data about a relative position between an observation target object observed through said first optical apparatus and said first optical apparatus; and
- a transmitting device to transmit the positional data,
- wherein a second optical apparatus used together with said first optical apparatus comprises:
  - a receiving device to receive the positional data transmitted by said first optical apparatus;
  - an observation direction determining device to determine an observation direction toward the observation object from said second optical apparatus on the basis of the positional data received by said receiving device; and
  - an output device to output data about the observation direction determined by said observation direction determining device.

10. An observing apparatus comprising first and second optical apparati for observing an observation target object, wherein in a coordinate system with a position of said first optical apparatus serving as an origin, (-Msinθ, L-Mcosθ) is the coordinate of said second optical apparatus and (Nsinα, Ncosα) is the coordinate of the observation target object, the following formula is established:

$$\tan\beta = \frac{(N\sin\alpha) - (-M\sin\theta)}{(N\cos\alpha) - (L - M\cos\theta)}$$

where:
- L is the distance from said first optical apparatus to a predetermined point of the coordinate system,
- M is the distance from said second optical apparatus to the predetermined point,
- N is the distance from said first optical apparatus to the observation target unit,
- θ is the angle made by directions toward said first and second optical apparati from the predetermined point,
- α is the angle made by directions toward the predetermined point and the observation target object from said first optical apparatus, and
- β is the angle made by a direction toward the predetermined point from said first optical apparatus and a direction toward the observation target object from said second optical apparatus.

11. An observing apparatus system comprising:
  a plurality of optical devices, each including
    a transmission unit to transmit a signal to the other optical devices and to indicate a position of an object to be observed, and
    a receiving unit to receive said signal transmitted by one of the other optical devices so that the receiving optical device can locate said object.

* * * * *